(12) United States Patent
Mohamed et al.

(10) Patent No.: US 7,100,022 B1
(45) Date of Patent: Aug. 29, 2006

(54) AREA AND POWER EFFICIENT VLIW PROCESSOR WITH IMPROVED SPEED

(75) Inventors: Moataz Mohamed, Irvine, CA (US);
John Spence, Villa Park, CA (US);
Kevin R. Bowles, Mission Viejo, CA (US); Chien-Wei Li, Urbana, IL (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 468 days.

(21) Appl. No.: 10/085,724

(22) Filed: Feb. 28, 2002

(51) Int. Cl.
*G06F 15/16* (2006.01)
*G06F 15/00* (2006.01)
(52) U.S. Cl. .................................. 712/24; 712/217
(58) Field of Classification Search ............ 712/24, 712/23, 217, 218, 28; 717/149
See application file for complete search history.

(56) References Cited

U.S. PATENT DOCUMENTS 5,574,939 A * 11/1996 Keckler et al. ............... 712/24
5,632,023 A * 5/1997 White et al. ................ 712/218
2001/0042190 A1* 11/2001 Tremblay et al. ........... 712/208
2002/0042909 A1* 4/2002 Van Gageldonk et al. .. 717/149
2004/0177224 A1* 9/2004 Devaney et al. ............ 711/148

* cited by examiner

Primary Examiner—Henry W. H. Tsai
(74) Attorney, Agent, or Firm—Farjami & Farjami LLP

(57) ABSTRACT

In one embodiment, move buses utilized in presently known VLIW processors are eliminated and replaced with a busing scheme which results in transfer of operands from each register file bank to any data path block while also reducing the total bus width and total power consumption associated with transport of operands from register file banks to data path blocks. According to this busing scheme, the speed of VLIW processor is also improved since the need for one clock cycle to move operands from one register file bank to another is overcome. In another embodiment, a scheduling restriction is used to eliminate the need for the presently required write back buses used by various data path blocks. In yet another embodiment, a scheduling restriction is imposed which results in a reduction of the number of ports, a reduction in the width of buses, and a reduction of power consumption.

11 Claims, 3 Drawing Sheets

| Port # | Execution Units | | Bus | |
|---|---|---|---|---|
| R0 | MULT 224 or ALU 226 | MULT 216 or ALU 218 | $R_a$ 264 | $R_a$ 248 |
| R1 | MULT 224 or ALU 226 | MULT 216 or ALU 218 | $R_b$ 266 | $R_b$ 246 |
| R2 | MULT 230 or ALU 228 | MULT 220 or ALU 222 | $R_a$ 264 | $R_a$ 248 |
| R3 | MULT 230 or ALU 228 | MULT 220 or ALU 222 | $R_b$ 266 | $R_b$ 246 |

AREA AND POWER EFFICIENT VLIW PROCESSOR WITH IMPROVED SPEED

BACKGROUND OF THE INVENTION

1. Field of the Invention

The present invention is generally in the field of processors. In particular, the present invention is in the field of VLIW processors.

2. Background Art

VLIW (Very Long Instruction Word) processors use an approach to parallelism according to which several instructions are included in a very long instruction word or a "VLIW packet." A VLIW packet typically contains a number of instructions which can be executed in the same clock cycle. Each instruction in a VLIW packet typically requires two source operands and the result of execution of each instruction is typically a single destination operand. For example, a VLIW packet containing six instructions would typically require concurrent access to twelve source operands. Moreover, the result of execution of the six instructions would typically be six destination operands.

Typically, the source operands in a VLIW processor are processed by multiple data path blocks, each data path block having a number of execution units such as ALUs and multipliers. Reading twelve source operands in a single clock cycle and/or writing back six destination operands in a single clock cycle requires the VLIW processor to have multiple register file banks to accommodate the reading of a large number of source operands or the writing back of a large number of destination operands. As such, a typical VLIW processor includes a number of register file banks from which source operands are read prior to execution in multiple execution units and to which destination operands are written back after execution of various instructions. Each register file bank is typically associated with, and coupled to, a respective data path block.

The fact that a VLIW processor typically has a number of register file banks and a number of execution units presents a challenge in VLIW busing architecture. In other words, the fact that a VLIW processor has a number of register file banks and a number of execution units requires a number of buses transporting source and destination operands from and to a large number of register file banks. Also, the buses carrying source and/or destination operands are wide buses since each operand can be 32 bits wide or, in some processors, 64 bits wide.

Thus, despite their advantages, the multiple execution units and register file banks also present certain disadvantages in processor design. For example, as mentioned above, multiple execution units and register file banks require a large number of wide buses to accommodate transport of source and destination operands to and from various execution units. As the number of these wide buses grows, more chip area, as well as more power, are consumed. Moreover, it is possible that a desired source operand is not present in a register file bank which is coupled to its corresponding data path block. To address this problem, a recent VLIW design interconnects various register file banks to each other via "move" buses which can accommodate transport of two source operands from one register file bank into another. As such, when a source operand that is a required by a certain data path block does not exist in the register file bank coupled to that data path block, the source operand is transferred by a "move" operation from the register file bank in which the operand resides to the register file bank which is coupled to the subject data path block. The move operation requires a clock cycle and as such slows down the VLIW processor. Moreover, the move operation consumes power and the move buses take up valuable chip area.

There is presently no known desirable technique or processor architecture to adequately address the problem of consumption of chip area for wide buses, such as wide "move" buses linking various register file banks. Moreover, there is presently no known desirable architecture or technique that, in addition to reducing chip area consumed by wide buses utilized to transport source and destination operands, also speeds up the VLIW processor and, moreover, reduces power consumption. As such, there is need in the art for a novel VLIW processor architecture and for new techniques to speed up the VLIW processor, reduce power consumption, and reduce chip area associated with wide buses utilized to transport operands between multiple register file banks and from multiple register file banks to multiple execution units.

SUMMARY OF THE INVENTION

The present invention is directed to an area and power efficient VLIW processor with improved speed. The various embodiments of the invention address and overcome the need in the art for a novel VLIW processor architecture and for new techniques to speed up the VLIW processor, reduce power consumption, and reduce chip area while accommodating multiple register file banks and multiple execution units.

In one embodiment, "move" buses utilized in presently known VLIW processors are eliminated and replaced with a novel busing scheme which results in transfer of operands from each register file bank to any data path block while also reducing the total bus width and total power consumption associated with transport of operands from register file banks to data path blocks. According to this novel busing scheme, the speed of VLIW processor is also improved since the need for one clock cycle to move operands from one register file bank to another is overcome.

In another embodiment, a scheduling restriction, which is made feasible due to the easy accessibility of operands to the various data path blocks, is used to eliminate the need for the presently required write back buses used by various data path blocks. In yet another embodiment, a scheduling restriction is imposed which results in a reduction of the number of ports and a reduction in the width of buses. Moreover, since the required buses are narrower and fully utilized during execution of instructions, excess power consumption is eliminated. Thus, according to the novel busing architecture and also the scheduling restrictions imposed by the present invention, increased processing speed, reduced power consumption, and a reduction in the required chip area are achieved. Other features and advantages of the present invention will become more readily apparent to those of ordinary skill in the art after reviewing the following detailed description and accompanying drawings.

BRIEF DESCRIPTION OF THE DRAWINGS

FIG. 3 is used to describe the techniques and advantages of the present invention related to scheduling restrictions and also related to use of read and write ports in various register file banks according to an embodiment of the present invention.

DETAILED DESCRIPTION OF THE INVENTION

The present invention is directed to an area and power efficient VLIW processor with improved speed. Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings.

Figure 1:
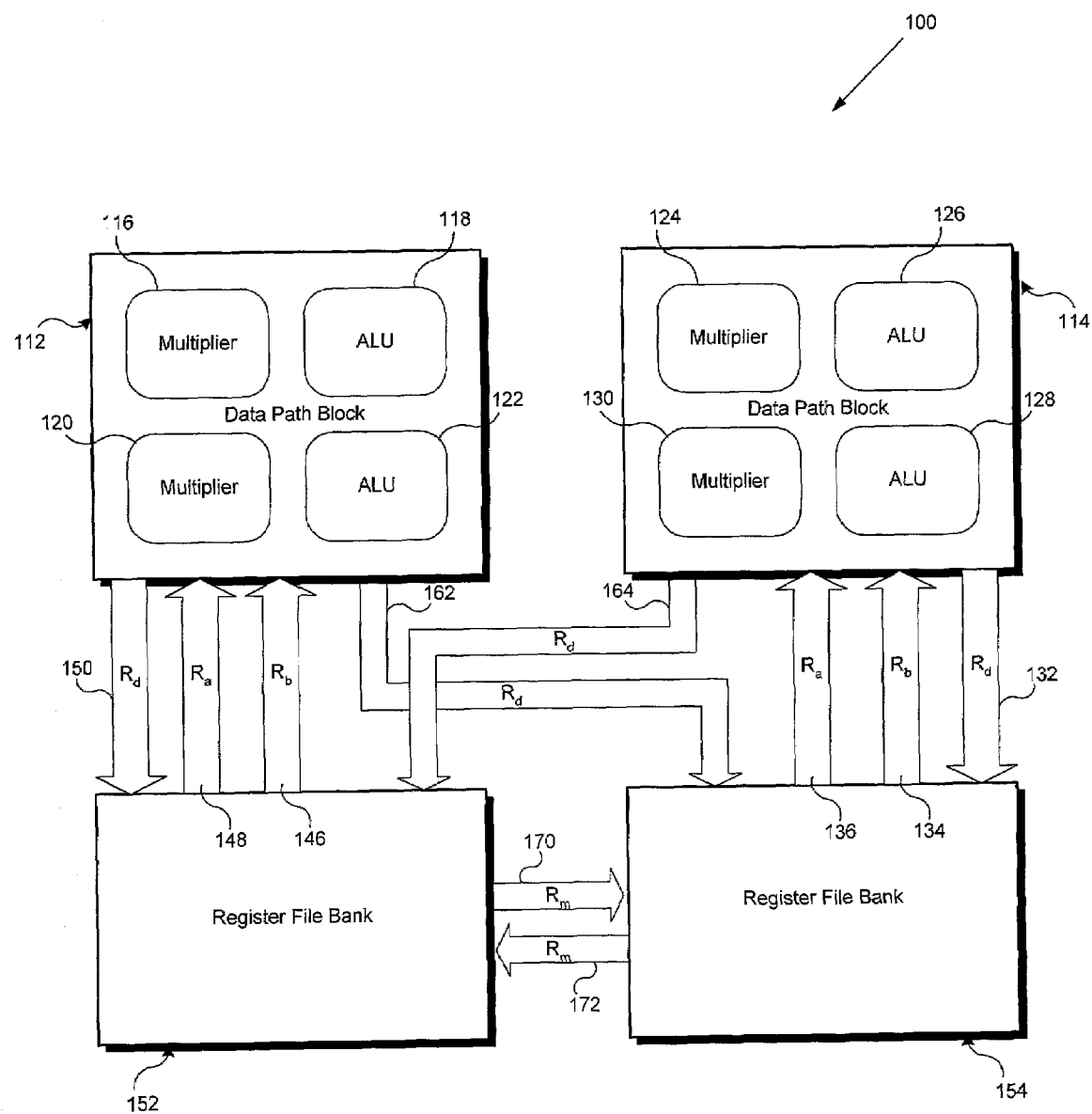
FIG. 1 illustrates a portion of an exemplary conventional VLIW processor.

In a VLIW processor, multiple execution units are present and require source operands. Furthermore, these execution units may be physically separated from one another and may require, for example, a pair of source operand buses to deliver source operands to them prior to execution. FIG. 1 illustrates a portion of an exemplary conventional VLIW processor, referred to as "VLIW processor 100" for brevity. Conventional VLIW processor 100 is comprised of two "data path blocks," i.e. data path blocks 112 and 114, and two "register file banks," i.e. register file banks 152 and 154. In conventional VLIW processor 100, register file banks 152 and 154 can be, for example, "scalar" register file banks. Data path blocks 112 and 114 each contain multiple executions units that require source operands from a register file bank prior to execution of various instructions.

In conventional VLIW processor 100 in FIG. 1, a total of ten buses are shown, including four "write" buses, i.e. write buses 132, 150, 162, and 164; four "read" buses, i.e. read buses 134, 136, 146, and 148; and two "move" buses 170 and 172. The "read" buses deliver a "source operand" from a register file bank to a data path block, while the "write" buses deliver a "destination operand" from a data path block to a register file bank. The "move" buses carry source operands from one register file bank to the other. The write buses shown in FIG. 1 are designated by $R_d$, the read buses are designated by $R_a$ and $R_b$, and the move buses are designated by $R_m$. The read buses designated as $R_a$ deliver source operand "a," while the read buses designated as $R_b$ deliver source operand "b".

For example, write bus 150 delivers write data, or "destination operands" from data path block 112 to register file bank 152, and write bus 162 delivers destination operands from data path block 112 to register file bank 154. Read buses 148 and 146, for example, deliver source operands "a" and "b," respectively, from register file bank 152 to data path block 112. Move buses 170 and 172 facilitate the movement of source operands back and forth between register file banks 152 and 154, as opposed to the other buses which facilitate the transfer of operands between a register file bank and a data path block. To be sure, a "write" bus, a "read" bus, and a "move" bus can, of course, be employed to perform either a read or a write operation and, in the present invention, a bus is referred to as a "write," "read," or "move" bus for reference purposes only.

In the present conventional VLIW processor 100, all buses, with the exception of move buses 170 and 172, are 32 bits wide. Each move bus 170 and 172 is at least 64 bits wide, since each move bus 170 and 172 must be able to carry two source operands, i.e. source operands "a" and "b," where, in the present example, a source operand is 32 bits wide. Thus, the collective width of move buses 170 and 172 in conventional VLIW processor 100 is at least 128 bits.

Data path block 112 comprises execution units such as multiplier 116, ALU 118, multiplier 120, and ALU ("arithmetic logic unit") 122 while data path block 114 comprises execution units such as multiplier 124, ALU 126, ALU 128, and multiplier 130. Read buses 146 and 148 deliver source operands from register file bank 152 to the execution units in data path block 112, i.e. multiplier 116, ALU 118, multiplier 120, and ALU 122. Similarly, read buses 136 and 134 deliver source operands from register file bank 154 to the execution units in data path block 114, i.e. multiplier 124, ALU 126, ALU 128, and multiplier 130.

In general, an execution unit in a data path block may require a source operand from any register file bank. For example, multiplier 124 of data path block 114 may require a source operand from either register file bank 152 or register file bank 154. Conventional VLIW processor 100, however, does not have an expedient means for delivering a source operand from register file bank 152 to an execution unit in data path block 114, or directly from register file bank 154 to an execution unit in data path block 112. In other words, given the architecture of conventional VLIW processor 100, register file bank 152 cannot directly communicate with data path block 114, and register file bank 154 cannot directly communicate with data path block 112.

Thus, by way of an example, in order to provide a source operand from register file bank 154 to data path block 114, the source operand is first transferred from register file bank 152, via move bus 170, to register file bank 154. Once in register file bank 154, the source operand may be delivered, via read bus 134 or 136, to data path block 114. The transfer of an operand between register file banks 152 and 154, via move bus 170 or 172, consumes one or more additional clock cycles and accordingly reduces the operating speed of conventional VLIW processor 100. Furthermore, transfer of a source operand results in significant additional power consumption in conventional VLIW processor 100 since the "toggling" of potentially all of the 64 bits in move bus 170 or 172 is required to complete the transfer of the source operand between register file banks 152 and 154.

Figure 2:
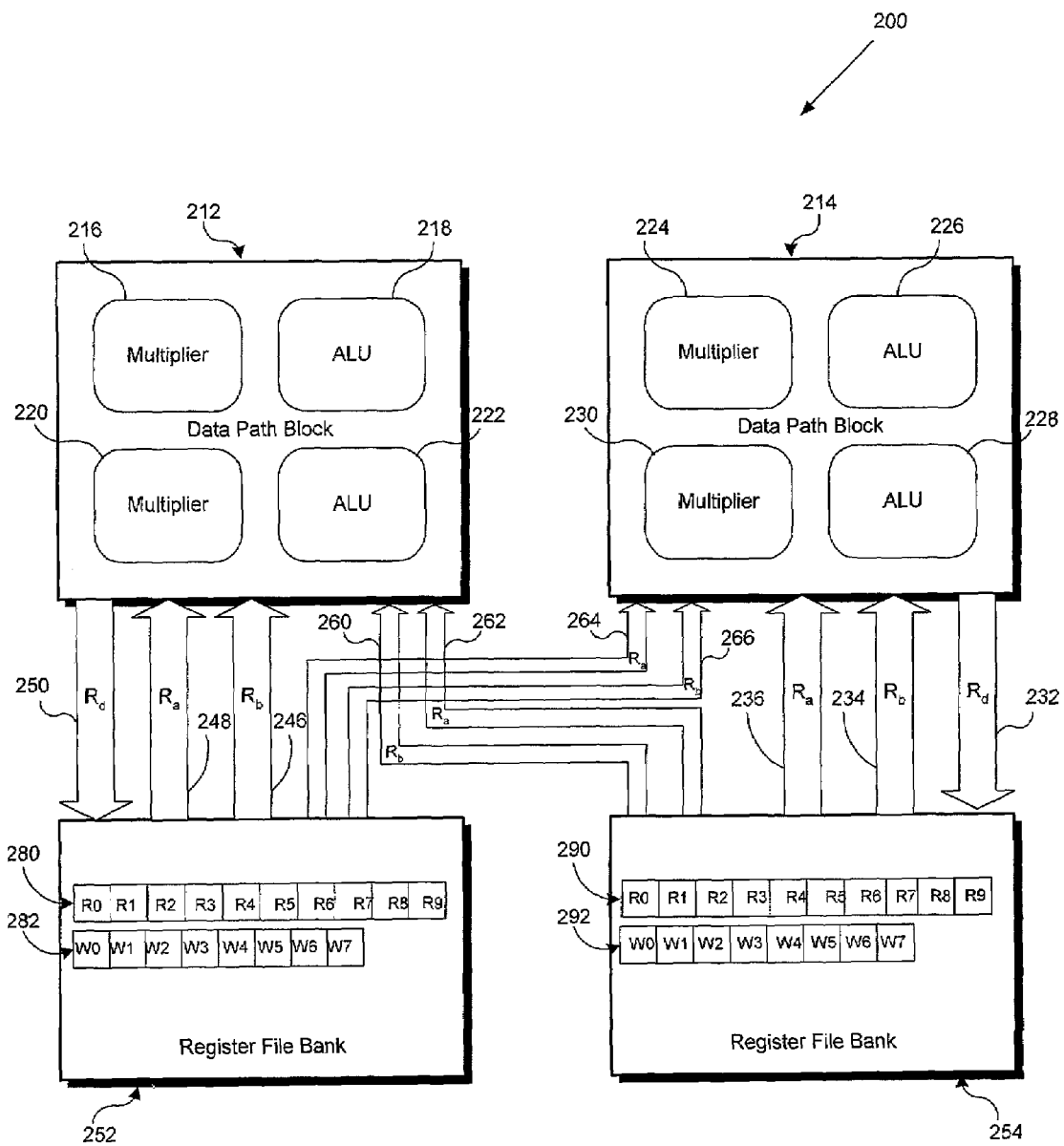
FIG. 2 illustrates a portion of an exemplary VLIW processor according to an embodiment of the present invention.

FIG. 2 illustrates an exemplary embodiment of the present invention which overcomes the speed and power inefficiencies of conventional VLIW processor 100 discussed above, as well as resulting in area savings. FIG. 2 shows certain relevant portions of the present invention's VLIW processor which, for brevity, is referred to simply as "VLIW processor 200" in the present application. In the manner described below, VLIW processor 200 allows for improved speed, power, and area efficiency compared to existing VLIW processors, for example, compared to conventional VLIW processor 100 of FIG. 1.

VLIW processor 200 comprises register file banks 252 and 254, data path blocks 212 and 214, "write" buses 250 and 232, and "read" buses 246, 248, 260, 262, 264, 266, 236, and 234. As stated above, a "write" bus and a "read" bus can, of course, be employed to perform either a read or a write operation and, in the present invention, a bus is referred to as a "write" or "read" bus for reference purposes only. Continuing with VLIW processor 200 in FIG. 2, data path block 212 comprises executions units such as multiplier 216, ALU 218, multiplier 220, and ALU 222, while data path block 214 comprises executions units such as multiplier 224, ALU 226, ALU 228, and multiplier 230.

Furthermore, a number of exemplary register file ports, including register file "read ports" and register file "write ports," are shown in FIG. 2. In an exemplary embodiment, register file banks 252 and 254 may each contain ten read ports and eight write ports, as shown in FIG. 2. Register file bank 252 comprises read ports R0, R1, R2, R3, R4, R5, R6, R7, R8, and R9, which are collectively referred to as read ports 280. Register file bank 252 further comprises write ports W0, W1, W2, W3, W4, W5, W6, and W7, which are collectively referred to as write ports 282. Similarly, register file bank 254 comprises read ports R0, R1, R2, R3, R4, R5, R6, R7, R8, and R9, which are collectively referred to as read ports 290. Register file bank 254 further comprises write ports W0, W1, W2, W3, W4, W5, W6, and W7, which are collectively referred to as write ports 292.

As is noted from the architecture of VLIW processor 200 in FIG. 2, "move" buses 170 and 172 in conventional VLIW processor 100 have been removed. Moreover, "write" buses 162 and 164 in conventional VLIW processor 100 have also been removed. On the other hand, "read" buses 260, 262, 264, and 266 have been added in VLIW processor 200 in the present exemplary embodiment. The architecture of the exemplary VLIW processor 200 in FIG. 2, along with its novel busing and scheduling scheme (the scheduling scheme is discussed in more detail in relation to FIG. 3) results in increased speed, reduced power consumption, and also reduced chip area. In that connection, read ports R0 through R9 and write ports W0 through W7 in register file bank 252, as well as read ports R0 through R9 and write ports W0 through W7 in register file bank 254 are specifically shown in the exemplary VLIW processor of FIG. 2 to further illustrate the operation and advantages of the present embodiment of the invention as discussed below.

It is recalled that "move" buses 170 and 172 in conventional VLIW processor 100 are utilized to move an operand from a first register file bank into a second register file bank so as to make the operand available to the data path block immediately adjacent to the second register file bank. As further discussed above, the moving of the operands from one register file bank into another results in power and speed inefficiencies due to the additional clock cycle needed to move the operand. According to the invention's novel scheme shown in FIG. 2, operands are not moved, and need not be moved, from one register file bank into another and a number of advantages follow.

As seen from the present embodiment's exemplary VLIW processor 200, read buses 260 and 262 connect register file bank 254 to data path block 212. Similarly, read buses 264 and 266 connect register file bank 252 to data path block 214. As such, operands present in register file bank 254 are accessed by data path block 212 through read buses 260 and 262 while operands existing in register file bank 252 are concurrently accessed by data path block 214 through read buses 264 and 266. Thus, the need for move buses 170 and 172 in conventional VLIW processor 100 is alleviated. Moreover, due to the fact that operands are delivered directly from either register file bank to either data path block, the additional clock cycle required to move an operand from one register file bank to the other register file bank prior to the delivery of the operand to the destination data path block is eliminated. The fact that operands do not go through move buses 170 and 172 of conventional VLIW processor 100 results in increased speed due to elimination of the additional clock cycle required in conventional VLIW processor 100. Moreover, since each move bus 170 and 172 is 64 bits wide, the charging and discharging of these buses for the purpose of accomplishing a move is avoided and as such tremendous power savings result.

It is noted that read buses 260, 262, 264, and 266 perform a function similar to read buses 248, 246, 236, and 234. As such, utilization of read buses 260, 262, 264, and 266 does not result in additional power consumption since a read operation must be performed regardless of whether an operand is in register file bank 252 or in register file bank 254. Moreover, each read bus 260, 262, 264, and 266 is 32 bits wide since, in the present embodiment, each read bus carries a 32-bit operand. Thus, the total width of read buses 260, 262, 264, and 266 in the present embodiment is equal to the total width of move buses 170 and 172 used in conventional VLIW processor 100. As such, the chip area consumed by move buses 170 and 172 is substantially equal to the chip area consumed by read buses 260, 262, 264, and 266. Thus, by replacing move buses 170 and 172 in conventional VLIW processor 100 with read buses 260, 262, 264, and 266 in VLIW processor 200 of the present embodiment, the present invention achieves increased speed and reduced power without increasing the required chip area.

A comparison of the exemplary embodiment of the invention shown as VLIW processor 200 in FIG. 2 with conventional VLIW processor 100 in FIG. 1 also reveals that "write" buses 162 and 164 in conventional VLIW processor 100 have been removed. The present invention does away with write buses 162 and 164 due, in part, to the imposition of a scheduling restriction which requires that the result of operations performed in data path blocks 212 and 214 be written to the immediately adjacent register file bank. In other words, according to the scheduling restrictions imposed by exemplary VLIW processor 200, the result of an operation performed in data path block 214 can be written back only into register file bank 254 through write bus 232. Similarly, the result of an operation performed in data path block 212 can be written back only into register file bank 252 through write bus 250. This is in contrast with conventional VLIW processor 100 where the result of an operation performed in a data path block can be written to an immediately adjacent register file bank as well as to a "remote" register file bank. In other words, according to conventional VLIW processor 100, the results of an operation performed in data path block 114 can be written to register file bank 154 through write bus 132 and can also be written to register file bank 152 through write bus 164. Similarly, the results of an operation performed in data path block 112 can be written to register file bank 152 through write bus 150 and can also be written to register file bank 154 through write bus 162.

The scheduling restriction discussed above, i.e. the restriction that a data path block in the present invention's exemplary VLIW processor 200 can only write back to an immediately adjacent register file bank, is feasible due to the fact that, according to the present invention, the operands residing in each register file bank 252 and 254 are readily available to either data path block 212 or 214 without the requirement of a time consuming move operation. In other words, according to the present invention, operands residing in register file banks 252 and 254 are equally accessible to either data path block 212 or data path block 214. As such, there is more flexibility as to where the results of operations performed in data path block 212 and data path block 214 can be written. This additional flexibility is due to the fact that, according to the present invention, data is equally available to both data path block 212 and 214 whether data is written into, and hence read from, register file bank 252 or 254. As such, there is no need to ensure that the result of an operation is written to a register file bank where the data is most likely to be read from. This additional flexibility in the present invention makes the elimination of write buses 162 and 164 in conventional VLIW processor 100 feasible. It is noted that in the present exemplary VLIW processor 200 and conventional VLIW processor 100, the result of each operation is a 32-bit word. As such, the elimination of write buses 162 and 164 results in a considerable area saving since two 32-bit wide buses, i.e. write buses 162 and 164 are removed.

It is recalled that one scheduling restriction in the present invention, which, as described above, is made feasible due to the novel architecture of the present exemplary VLIW processor 200, is related to the elimination of write buses 162 and 164 in conventional VLIW processor 100. With the aid of FIG. 3, other advantages of the present invention related to scheduling restrictions and also related to use of read ports 280 and 290, and write ports 282 and 292 are now discussed. In that connection, read ports R0, R1, R2, and R3 in read ports 280 in register file bank 252 are used as an example in FIG. 3 to illustrate the concepts related to the invention's area and power savings with respect to the scheduling restrictions and the novel architecture of the present invention. However, it is manifest that the concepts discussed herein extend to all read ports R0 through R9 in read ports 280 and, moreover, to read ports R0 through R9 in read ports 290, to write ports W0 through W7 in write ports 282, and to write ports W0 through W7 in write ports 292.

Column 310 in FIG. 3 shows a list of exemplary read ports R0, R1, R2, and R3 which are part of read ports 280 in register file bank 252. Columns 312 and 314 of FIG. 3 show a list of execution units while columns 316 and 318 show the read buses utilized for transporting operands from read ports R0, R1, R2, and R3 to data path blocks 212 and 214. FIG. 3 shows the relationship between read ports R0, R1, R2, and R3 in register file bank 252 with respect to various execution units in data path blocks 212 and 214 and also with respect to read buses 264, 248, 266, and 246.

More particularly, FIG. 3 shows that, as a result of scheduling restrictions according to one embodiment of the invention, during a single clock cycle, read bus 264 is utilized to transport an operand from read port R0 in register file bank 252 to either multiplier 224 or ALU 226 in data path block 214. Similarly, as shown in FIG. 3 and as a result of scheduling restrictions according to the present embodiment of the invention, during a single clock cycle, read bus 248 is utilized to transport an operand from read port R0 in register file bank 252 to either multiplier 216 or ALU 218 in data path block 212. Likewise, read bus 266 is utilized to transport an operand from read port R1 in register file bank 252 to either multiplier 224 or ALU 226 in data path block 214; read bus 246 is utilized to move an operand from read port R1 in register file bank 252 to either multiplier 216 or ALU 218 in data path block 212.

As further shown in FIG. 3, according to the scheduling restrictions imposed by an embodiment of the present invention, read bus 264 is used to transport an operand from read port R2 in register file bank 252 to either multiplier 230 or ALU 228 in data path block 214; read bus 248 is utilized to move an operand from read port R2 in register file bank 252 to either multiplier 220 or ALU 222 in data path block 212; read bus 266 is used to move an operand from read port R3 in register file bank 252 to either multiplier 230 or ALU 228 in data path block 214; and read bus 246 is utilized to move an operand from read port R3 in register file bank 252 to either multiplier 220 or ALU 220 in data path block 212.

Thus, according to an embodiment of the present invention, a scheduling restriction is imposed on the relationship between read ports, buses, and execution units as illustrated in relation to FIG. 3 and as explained above. It is noted that the restrictions shown in FIG. 3 are only for illustration purposes and, in the present embodiment of the invention, similar restrictions can extend to all read ports in both register file banks 252 and 254 as well as all write ports in both register file banks 252 and 254. The scheduling restrictions, such as those discussed above, are feasible since according to an embodiment of the invention and according to empirical data utilized to arrive at the present invention, certain combinations of instructions and operands are rare enough to permit the imposition of scheduling restrictions discussed above. For example, it is rare for a computer algorithm to require an operand for simultaneous use by both multiplier 224 and ALU 226. As such, according to the present embodiment, a scheduling restriction is imposed such that an operand residing in port R0 in register file bank 252 can be transported by read bus 264 to either multiplier 224 or ALU 226. Thus, the need for a wider bus that can accommodate concurrent transport of two operands, one to multiplier 224 and another to ALU 226 is avoided. Likewise, it is rare for a computer algorithm to require an operand for concurrent use by both multiplier 220 and ALU 222. Thus, according to the present embodiment, a scheduling restriction is imposed such that an operand residing in port R3 in register file bank 252 can be transported by read bus 264 to either multiplier 220 or ALU 222. Thus, the need for a wider bus that can accommodate simultaneous transport of two operands, one to multiplier 220 and another to ALU 222 is avoided. The above scheduling restrictions explained in relation to FIG. 3 result in area savings since the need for additional ports and wider buses is avoided. Moreover, since the read buses are narrower and fully utilized during execution of instructions, excess power consumption is eliminated and significant power savings also result.

As such, it is appreciated that according to the novel busing architecture and also the scheduling restrictions imposed by the present invention, increased processing speed, reduced power consumption, and a reduction in the required chip area are achieved. From the above description, it has been demonstrated that the present invention addresses the need in the art for a VLIW processor with improved speed and also improved power and area efficiency.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. For example, while the present exemplary embodiment of the invention has been described with respect to two register file banks and two data path blocks, it is readily apparent to a person of ordinary skill in the art that any number of register file banks and/or data path blocks can utilize the teachings of the present invention. Furthermore, it is apparent to a person of ordinary skill in the art that execution units other than ALUs and multipliers can be utilized in one or more of the data path blocks. As such, reference to the ALUs and multipliers in data path blocks 212 and 214 are only exemplary and for the purpose of illustrating the concepts of the present invention. Further, the number of read ports or write ports, the size of the ports and the width of buses interconnecting the register file banks to the data path blocks can all be varied without departing from the concepts taught by the present invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

Thus, an area and power efficient VLIW processor with improved speed has been described.

The invention claimed is:

1. A VLIW processor comprising:
   first and second register file banks, said first register file bank comprising a first plurality of read ports and write ports, and said second register file bank comprising a second plurality of read ports and write ports;
   first and second data path blocks, said first data path block comprising a first plurality of execution units, and said second data path block comprising a second plurality of execution units;
   a first plurality of buses coupling said first plurality of read ports to each of said first and second data path blocks;
   a second plurality of buses coupling said second plurality of read ports to each of said first and second data path blocks;
   wherein an operand residing in said first plurality of read ports is concurrently accessed by said first data path block and by said second data path block, wherein said operand is used by only one execution unit in said first data path block, and by only one execution unit in said second data path block, during a single clock cycle and wherein a result of an operation performed in said first data path block is written to only said first plurality of write ports without being written to said second plurality of write ports, wherein said VLIW processor does not include a move bus.

2. The VLIW processor of claim 1 wherein an operand residing in said second plurality of read ports is concurrently accessed by said first plurality of execution units in said first data path block and by said second plurality of execution units in said second data path block.

3. The VLIW processor of claim 1 wherein each of said first and second plurality of execution units is selected from the group consisting of an ALU and a multiplier.

4. The VLIW processor of claim 1 wherein a result of an operation performed in said second data path block is accessed only by said second plurality of write ports without being accessed by said first plurality of write ports.

5. A VLIW processor comprising:
   a plurality of register file banks, each of said plurality of register file banks comprising a respective plurality of read ports and write ports;
   a plurality of data path blocks, each of said plurality of data path blocks comprising a respective plurality of execution units;
   a plurality of buses coupling said plurality of register file banks to each of said plurality of data path blocks;
   wherein an operand residing in each of said respective plurality of read ports is concurrently accessed by each of said plurality of data path blocks, wherein said operand is used by only one execution unit in each of said plurality of data path blocks, during a single clock cycle and wherein a result of an operation performed in one of said plurality of data path blocks is written to only said respective plurality of write ports, wherein said VLIW processor does not include a move bus.

6. The VLIW processor of claim 5 wherein each of said respective plurality of execution units is selected from the group consisting of an ALU and a multiplier.

7. A VLIW processor comprising:
   first and second register file banks, said first register file bank comprising a first plurality of read ports and write ports, and said second register file bank comprising a second plurality of read ports and write ports;
   first and second data path blocks, said first data path block comprising a first plurality of execution units, and said second data path block comprising a second plurality of execution units;
   a first plurality of buses coupling said first plurality of read ports to each of said first and second data path blocks;
   a second plurality of buses coupling said second plurality of read ports to each of said first and second data path blocks;
   wherein during a single clock cycle an operand residing in one of said first plurality of read ports is used by only one execution unit in said first plurality of execution units in said first data path block and by only one execution unit in said second plurality of execution units in said second data path block wherein a result of an operation performed in said first data path block is written to only said first plurality of write ports without being written to said second plurality of write ports, wherein said VLIW processor does not include a move bus.

8. The VLIW processor of claim 7 wherein during said single clock cycle an operand residing in one of said second plurality of read ports is used by only one of said first plurality of execution units in said first data path block.

9. The VLIW processor of claim 7 wherein during said single clock cycle an operand residing in one of said second plurality of read ports is used by only one of said second plurality of execution units in said second data path block.

10. The VLIW processor of claim 7 wherein each of said first and second plurality of execution units is selected from the group consisting of an ALU and a multiplier.

11. The VLIW processor of claim 7 wherein a result of an operation performed in said second data path block is accessed only by said second plurality of write ports without being accessed by said first plurality of write ports.

* * * * *